May 4, 1954
W. G. RORK
2,677,803
PROVING PROCESS FOR PRIMERS OF
ELECTRICALLY FIRED AMMUNITION
Filed Sept. 12, 1950
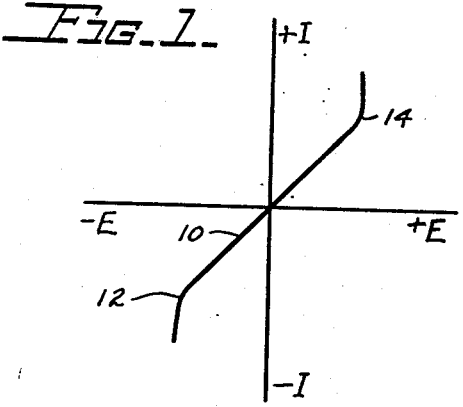
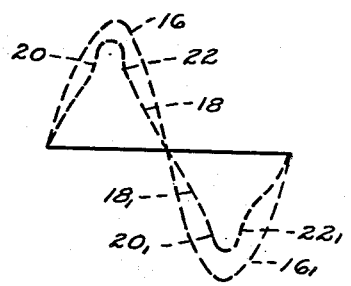
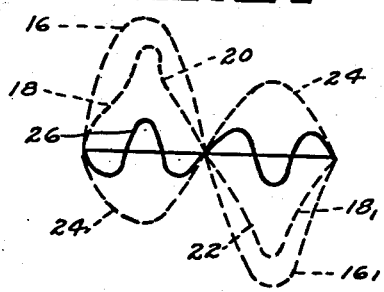
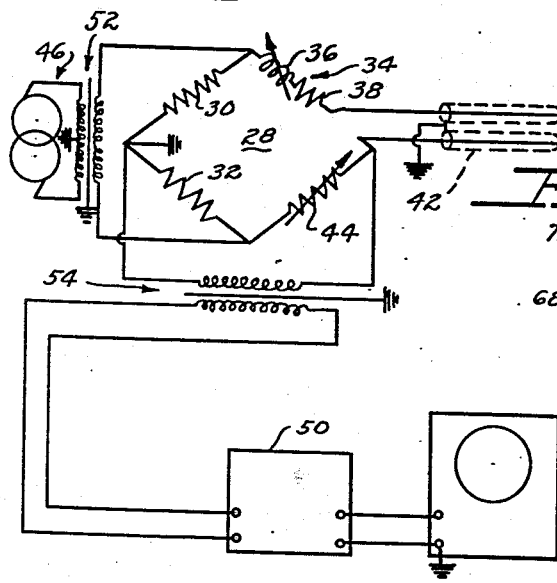
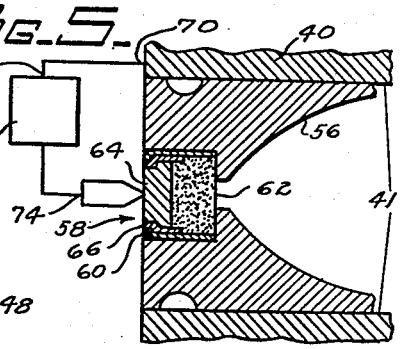
INVENTOR.
WALLACE G. RORK
BY Wade Koontz AND
Frederick W. Cotterman
ATTORNEYS Patented May 4, 1954

2,677,803

UNITED STATES PATENT OFFICE 2,677,803

PROVING PROCESS FOR PRIMERS OF ELECTRICALLY FIRED AMMUNITION

Wallace G. Rork, Springfield, Ohio

Application September 12, 1950, Serial No. 184,508

6 Claims. (Cl. 324—54)

(Granted under Title 35, U. S. Code (1952), sec. 266)

The invention described herein may be manufactured and used by or for the Government for governmental purposes without payment to me of any royalty thereon.

This invention relates to primers for electrically fired ammunition with special reference to a hook-up of instrumentalities for testing the ability of the primer to fire the ammunition with which it is associated.

Primers of the kind to which this invention belongs are fitted to the closed end of a shell case of electrically fired ammunition and contain material which, when a proper current is passed through the firing material of the primer, will explode the charge.

At the present time ohmic tests only are being made at Government arsenals on final inspection of ammunition primers, but this process is inadequate because it may allow a defective primer to pass inspection even though the poor contact of the testing apparatus could register proper ohmic resistance.

It is therefore an object of this invention to provide testing equipment and a procedure which will result in a more reliable test than may be had by present methods.

In the present invention the basis of the process for testing the firing ability of electrically fired ammunition primers lies in an application of the principle of generation of a third harmonic current occurring as a result of wave form distortion of an alternating testing current passing through a nonlinear resistance, and inasmuch as the primer material acts as a nonlinear resistance, the presence of a third harmonic in the circuit through the primer material indicates that the primer in the circuit has passed the required test.

In the drawings herewith provided as an illustrative embodiment of the invention, Figs. 1, 2 and 3 are purely explanatory of the principle involved in subject invention;

Fig. 4 shows a method by which the third harmonic voltage may be identified and measured;

Fig. 5 is a cross sectional view of electrically fired ammunition, showing a part of the shell case and details of the firing primer, together with a schematic representation of the electric test circuit and the electric measuring equipment.

Like reference characters refer to like parts throughout the several views.

Referring to Fig. 1 in which E is the voltage and I the current, the curve 10 is nonlinear, indicating that current I does not vary linearly with variation in voltage E. Curve 10 portrays the effect of a nonlinear resistance upon current. At points 12 and 14 the curve rises sharply as voltage is increased in a positive or negative direction.

Fig. 2 shows the basic voltage wave 16 which is assumed to have no wave form distortion, while in the current wave 18 wave form distortion appears as at 20 and 22. This distortion takes place at similar points on both forward and reverse portions of the current wave 18, which indicates third harmonic distortion.

Fig. 3 shows the driving voltage wave 16 and the current wave 18, the current wave being shown distorted as at 20 and 22 as it would be if it were passing through a nonlinear resistance, as, for instance, through the primer material. If another current 24, whose wave form is equal and opposite to that of the fundamental of current wave 18, is introduced by appropriate means, as, for instance, by a bridging network, the curve 24 may be subtracted from the curve 18, leaving a residual curve 26 representing current which consists of the distortion components of the basic current. Since there are three complete cycles of curve 26 as compared to one cycle of curve 18 it is evident that current represented by curve 26 is equal to the third harmonic of the basic current.

In Fig. 4, the instrumentalities and their hookup for identifying and measuring the third harmonic comprise a bridge 28, the two fixed arms 30 and 32 of which each consist of a 5000 ohm resistor. The third or unknown arm 34 includes a variable inductor which may preferably be of the General Radio Type 107, and which includes a pure inductance 36 and a resistance 38. The primer, the unknown component, is located in gun 40 and is series connected in the arm 34 by shielded leads 42. A variable resistor 44 forms the fourth arm of the bridge and may preferably be a Leeds and Northrup Precision Decade Resistance Box.

The bridge circuit is supplied by a generator 46 which may preferably be a Hewlett-Packard Type 205 AG. Bridge balance will be indicated by oscilloscope 48 through an amplifier 50 which may preferably be a General Radio Null Detector Type 1231-B.

In the instant embodiment of the invention, the resistors 30 and 32 together with their shielded transformers 52 and 54 may be included in a shielded assembly which is manufactured by General Radio as "Capacity Bridge No. 216."

Fig. 5, a fragmentary cross sectional view of the rear end of the gun 40 of Fig. 4 drawn to an enlarged scale, comprises a fragment of the gun 40 containing a firing chamber 41, a fragment of the shell case 56, and a section through the primer 58. The primer consists of a primer case 60, the primer material 62 which is in contact with the terminal 64 and primer case 60, with insulator 66 so placed as to insulate the terminal 64 from the primer case 60.

In Fig. 5 the entire measuring equipment shown in Fig. 4 is schematically represented as being contained in an enclosure 68, the electrical circuit extending from the gun at 70 through the enclosure 68 at 72, through electrode 74, terminal 64, firing material 62 to firing chamber 41.

Primers may be tested by connecting the measuring equipment shown in Fig. 4 as at 68, Fig. 5. Some of the advantages of the testing equipment herein disclosed are (1) that it indicates that the primer material is in contact with the insulated firing terminal 64 and ground. (2) It eliminates the possibility of a shorted primer to pass inspection even though poor contact might register proper ohmic resistance. (3) It eliminates the possibility that a partially shorted primer might pass inspection by apparent change in third harmonic signal strength as compared to a standard strength.

Having shown and described an exemplification of my invention, I claim:

1. A method of testing a primer of the type fired by the passage of an electric current through the primer material and in which said primer material has a nonlinear electrical impedance, said method consisting of applying a sinusoidal voltage to a circuit containing the primer and detecting the harmonic current generated in said circuit by the said primer material.

2. A method of testing primers of the type fired by the passage of an electric current through the primer material and in which said primer material has a nonlinear electrical impedance, said method consisting of applying a sinusoidal voltage to a circuit containing the primer and detecting the harmonics in the resulting alternating current wave form which is distorted as the result of the nonlinear impedance characteristic of the primer material.

3. The method of investigating the current path through an electrically fired primer to determine whether the principal current flow is through the primer material which has a nonlinear impedance characteristic, or through a short circuit around the primer material, which consists of applying a sinusoidal voltage to a circuit containing said primer and investigating the resulting current in said circuit for the presence of harmonics of said sinusoidal voltage produced by the nonlinearity of said primer material, the absence of which harmonics indicating a defective primer.

4. The method of testing a primer of the type fired by the passage of an electric current through the primer material and in which said primer material has a nonlinear electrical impedance, said method comprising the steps of applying a sinusoidal voltage to a circuit containing said primer, attenuating said sinusoidal voltage to produce a sinusoidal reference voltage of reduced amplitude, subtracting said reference voltage from the voltage across a portion of said circuit including said primer to obtain a difference voltage, and adjusting the amplitude of the current in said circuit until said difference voltage is a minimum, a minimum difference voltage greater than zero indicating a satisfactory primer.

5. Testing apparatus for a primer of the type fired by the passage of an electric current through the primer material and in which said primer material has a nonlinear electrical impedance, said apparatus comprising a circuit containing said primer as an element therein, means for applying a sinusoidal voltage to said circuit, and means for detecting the presence of harmonics of said sinusoidal voltage in said circuit, the presence of such harmonics indicating a satisfactory primer.

6. Testing apparatus for a primer of the type fired by the passage of an electric current through the primer material and in which said primer material has a nonlinear electrical impedance, said apparatus comprising a circuit containing said primer as an element therein, means for applying a sinusoidal voltage to said circuit, means for attenuating said sinusoidal voltage to produce a sinusoidal reference voltage of reduced amplitude, means for subtracting said reference voltage from the voltage across a portion of said circuit including said primer to obtain a difference voltage, and means for adjusting the current in said circuit until said difference voltage is a minimum, a minimum difference voltage greater than zero indicating a satisfactory primer.

References Cited in the file of this patent

UNITED STATES PATENTS

| Number | Name | Date |
| --- | --- | --- |
| 2,005,011 | Specht | June 18, 1935 |
| 2,007,772 | Sams et al. | July 9, 1935 |
| 2,371,636 | McConnell | Mar. 20, 1945 |
| 2,451,613 | Darby et al. | Oct. 19, 1948 |
| 2,466,746 | Shive | Apr. 12, 1949 |
| 2,523,017 | Harrison | Sept. 19, 1950 |
| 2,585,121 | Hartman | Feb. 12, 1952 |